DAVID E. HERVEY
INVENTOR.

Sept. 5, 1967 D. E. HERVEY 3,339,629
GROUND STORAGE MEANS FOR STRUCTURE HEATING AND COOLING SYSTEMS
Original Filed May 20, 1963 4 Sheets-Sheet 2

DAVID E. HERVEY
*INVENTOR.*

BY *John G. Mills*

ATTORNEY

Sept. 5, 1967 D. E. HERVEY 3,339,629
GROUND STORAGE MEANS FOR STRUCTURE HEATING AND COOLING SYSTEMS
Original Filed May 20, 1963 4 Sheets-Sheet 3

DAVID E. HERVEY
*INVENTOR.*

BY *John G. Mille*

ATTORNEY

United States Patent Office 3,339,629
Patented Sept. 5, 1967

3,339,629
GROUND STORAGE MEANS FOR STRUCTURE
HEATING AND COOLING SYSTEMS
David E. Hervey, Elm City, N.C., assignor to Industrial
Institution International, Ltd., Elm City, N.C.
Original application May 20, 1963, Ser. No. 281,629, now
Patent No. 3,262,493, dated July 26, 1966. Divided
and this application May 24, 1966, Ser. No. 552,474
5 Claims. (Cl. 165—45)

This is a division of my co-pending application, Ser. No. 281,629, filed May 20, 1963, and now Patent No. 3,262,493 issued July 26, 1966 and relates to heating and cooling a structure by using climatic heat and cold. More particularly this invention relates to heating and cooling a structure by the use of natural heat and cold ambient to the structure without the use of mechanical, chemical, or other means of increasing said heat or cold for such purposes.

A preferred embodiment of this invention incorporates the improved collection and storage of heat and cold, each in one season for use in the opposite season, said storage being in large blocks of undisturbed earth.

Said preferred embodiment also incorporates, in certain desired applications, the use of a single large block of undisturbed earth both for the storage of cold in the winter to be used the following summer and for storage of heat that summer to be used the next winter.

Also, this invention incorporates a dual purpose method and means of heat removal from a structure both for the cooling of said structure and for the storing of said heat for later use in warming the structure. Conversely, this invention incorporates the removal of cold from a structure for the dual purpose of warming said structure and storing said cold in the one process and for the later use of said cold for cooling said structure.

In some cases the most efficient application of this invention incorporates the graduated zoning of said heat and cold storage areas outwards from the center with lessening intensity so that heat and cold of multiple intensities may be received and stored as available and so that perimeter losses of heat or cold (as the case may be) may be reduced.

This invention also incorporates the use of ambient temperatures of soil surrounding a structure to semi-heat and cool the exterior walls of a structure in order to reduce the heating and cooling load of the interior portions of that structure.

This invention also incorporates the provision of an improved system of collecting solar heat and of a basically new concept of storing this heat deep within a large block of undisturbed earth in an extremely efficient and economical manner, requiring only negligible maintenance and with operating costs and installation costs being astonishingly low.

In comparison with the heat storage facilities of this invention, all prior solar heat collectors and transfer element are completely inadequate and could not accomplish what has been accomplished by my present invention which has been actually constructed and used over two entire winter heating periods and summer cooling periods.

My collector serves the dual purpose of collecting cold at night in the winter and transferring it to a cold storing block of earth while simultaneously heating the roof surface of the structure and thereby reducing its heat load.

The structure element in my present invention is without precedence in several ways. Natural heat and natural cold are collected and stored in the ground and are brought back to the structure to make it comfortable year round. This process is augmented by current climatic heat and cold collection so that no auxiliary house heating or cooling systems are needed, even in relatively severe climates.

Various temperatures of both heat and cold may be stored and then used in order to conserve the stored heats of higher temperatures and the stored colds of lower temperature; or the said various temperatures may be used directly so as to utilize lower temperatures of heat and higher temperatures of cold. Thus, the house heating and cooling loads are greatly reduced by using low heat and low cold temperature values in hollow exterior wall zones, said low heat and cold values would otherwise be lost.

Also, each element of the structure heating and cooling system may be used either for collecting heat or collecting cold to be transferred and stored. Each element may be used as a structure conditioning element as well. In fact, with this invention the elements may be performing both functions at the same time.

Thus, the colder the winter is the better the elements are for conditioning the house the next summer and vice versa; not only is this true, but the act of storing cold warms the structure and the act of storing heat cools the structure, both when needed most.

It is an object, therefore, of this invention to collect, store, and use natural heat and cold to condition a structure.

Another object of this invention is to provide a threefold structure conditioning system comprising an improved solar collector, improved and adequate ground storage, and improved structure conditioning means.

Still another object of this invention is to provide a method and means for semi heating and cooling the exterior walls of a structure by using natural heat and cold of low intensity near a structure to reduce the interior heating and cooling load of the structure.

Another object of this invention is to provide a very inexpensive system for large scale storage of heat and cold in undisturbed earth and also for the removal and use thereof when needed.

Another object of this invention is to provide multiple zoned heat and cold storage blocks of earth for storing various intensities or temperatures of heat or cold.

Still another object of this invention is to provide concentric zones of heat and cold storage to reduce perimeter losses of heat and cold from that storage area by conduction.

A further object of this invention is to collect, store, and use natural heat and cold by the combined processes of radiation, conduction, and connection to completely temperature condition a structure.

Further objects will be apparent from the specifications and drawings, and the more detailed description and illustration of preferred embodiments contained herein must not be construed to limit the scope of the invention.

Referring to the drawings.

The above mention drawings illustrate a typical domestic installation embodying the invention by way of example. Following is a more detailed description of same.

Figure 1:
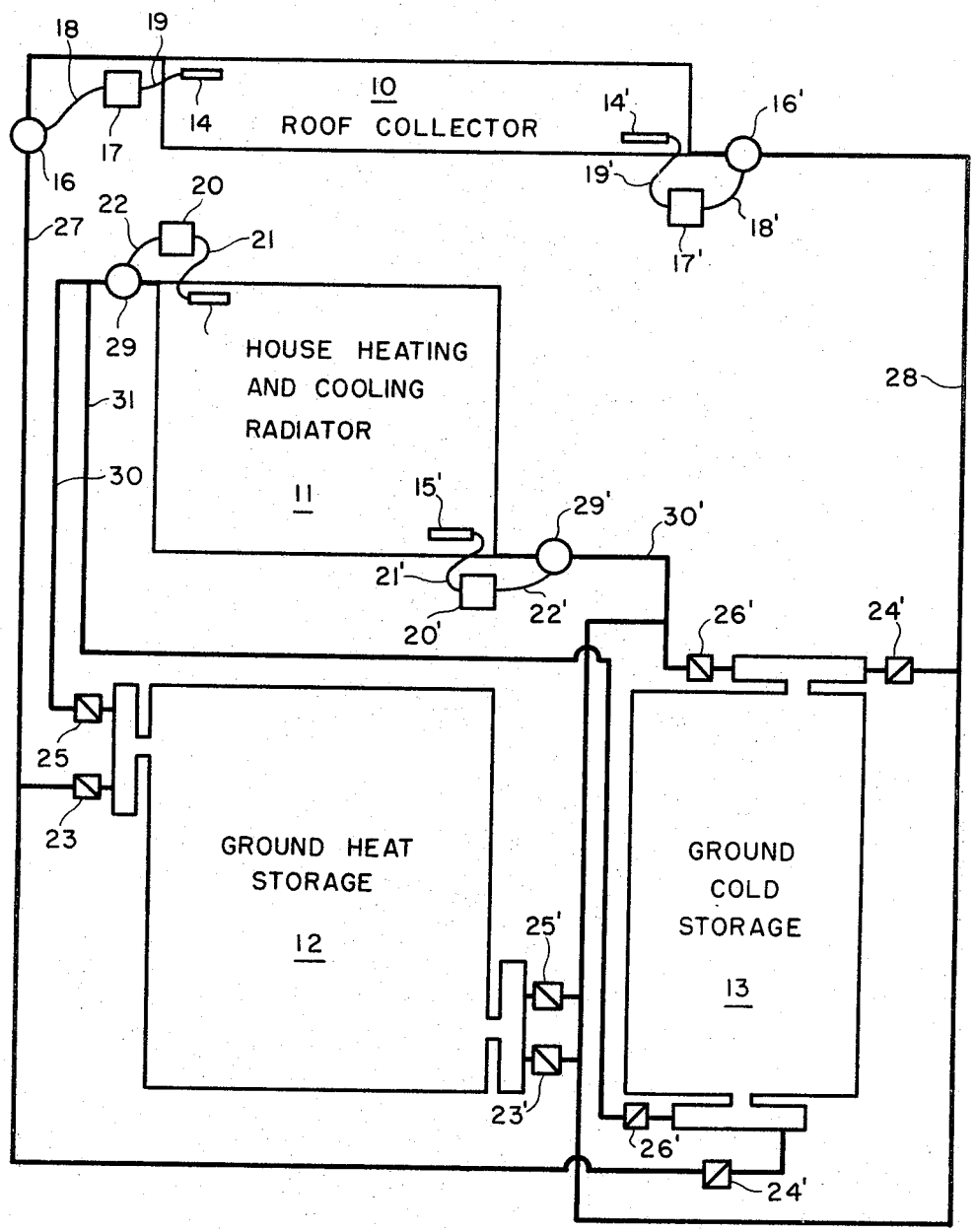
FIG. 1 is a schematic drawing of basic elements of the invention.

Referring to FIG. 1 of the drawings, the various elements are shown as follows: the roof collector 10, house heating and cooling radiator 11, a ground heat storage block 12, and ground cold storage block 13.

On a typical summer day when the fluid in solar collector 10 reaches a temperature of say 180° F., aquastat 14 with capillary 19 activates electric switch 17 which activates electric motor circulator 16 by way of electrical line 18 causing the hot fluid to pass from collector 10 out through pipe line 27 thence through check valve 23 into ground storage coil 12 and being a closed fluid system, this causes a counter flow of fluid of the temperature ambient coil 12 of say 70° F. to flow out through check valve 23', through line 28 and collector 10; said cooler 70° F. temperature then causing probe 14 to break the circuit from switch 17 by way of line 18 to circulator 16 and causing it to stop until solar heat again raises the temperature of the fluid in collector 10 to the pre-set temperature of say the 180° F. at which time the foregoing process is repeated. By this process, fluid of higher heat is transferred repeatedly from collector 10 to ground heat storage coil 12 and the heat thereof flows by conduction into the earth block ambient coil 12.

Likewise, in the winter time at night when the temperature of the fluid in the roof collector 10 drops to a preset point, say 35° F., aquastat 14' by means of capillary 19' activates switch 17' which makes on the fall to activate motor circulator 16' by way of electric line 18' which causes flow out of collector 10 by means of line 28 through check valve 24 into cold storage coil 13 causing thereby counterflow from coil 13 through check valve 24' and line 27 into collector 10 of fluid from cold storage 13 of say 45° F. until it reaches aquastat 14' causing its temperature to rise thereby opening switch 17' by means of capillary 19' and stopping electric motor circulator 16'.

When the structure 32 needs to be heated by structure radiator 11 as sensed by thermo-probe 15 which may be inside or outside radiator 11, switch 20 activated by capillary 21 conducts electricity via line 22 to motor fluid circulator 29 causing fluid in radiator 11 to flow through line 30 and check valve 25 into ground storage coil 12 and being a closed circuit this causes heated fluid in coil 12, by counter-flow action, to flow through check valve 25' and line 30' into house heating radiator 11 thus heating it and heating the structure. By repeated exchanges of fluid in radiator 11 (which has dissipated its heat to the structure 32) with the fluid in heat storage coil 12 which has absorbed heat from the ground storage block of earth surrounding coil 12 the structure is continually heated.

When the structure 32 needs to be cooled, a similar exchange takes place between house radiator coil 11 and cold storage coil 13 activated by thermo-probe 15', capillary 21', switch 20', line 22', and motor fluid circulator 29' through line 30' check valve 26' into coil 13 with counterflow of the cold fluid in coil 13 passing through check valve 26 and line 31 into house coil 11. The cold fluid in coil 11 then absorbs heat from the structure because of the differential of temperature between the two; and when it becomes sufficiently warm, thermo-probe 15' again activates a similar exchange of fluids between coil 11 and coil 13 so that the warmed fluid is transferred to coil 13 where the heat in said fluid is absorbed by the cold block of earth ambient coil 13, slowly but gradually warming said earth ambient coil 13.

The following winter at night when the fluid in the roof collector 10 reaches a pre-determined low temperature below that of coil 13 and the surrounding earth, said coil 13 is again cooled by the fluid from collector 10 as previously described but in doing so the heat stored in earth block ambient coil 13 from the summer cooling operations of the structure 32 containing roof collector coil 10 is heated to say 40° F. By passing this warmed fluid through the walls of structure 32 on its way from coil 13 to collector 10 the heating load of said structure 32 is reduced by semi-heating of its exterior surface. This reduction of heat loss from a house for instance may be very substantial, especially in a severe climate or on very cold days and nights since the temperature differential from inside to outside the structure 32 may be from 70° F. to 40° F. instead of from 70° F. to say 10° below zero (thus it is as though the structure was built in a semi-tropical region).

Power is furnished to electric switches 17 and 17' and 20 and 20' by regular house electric circuits not shown.

Figure 2:
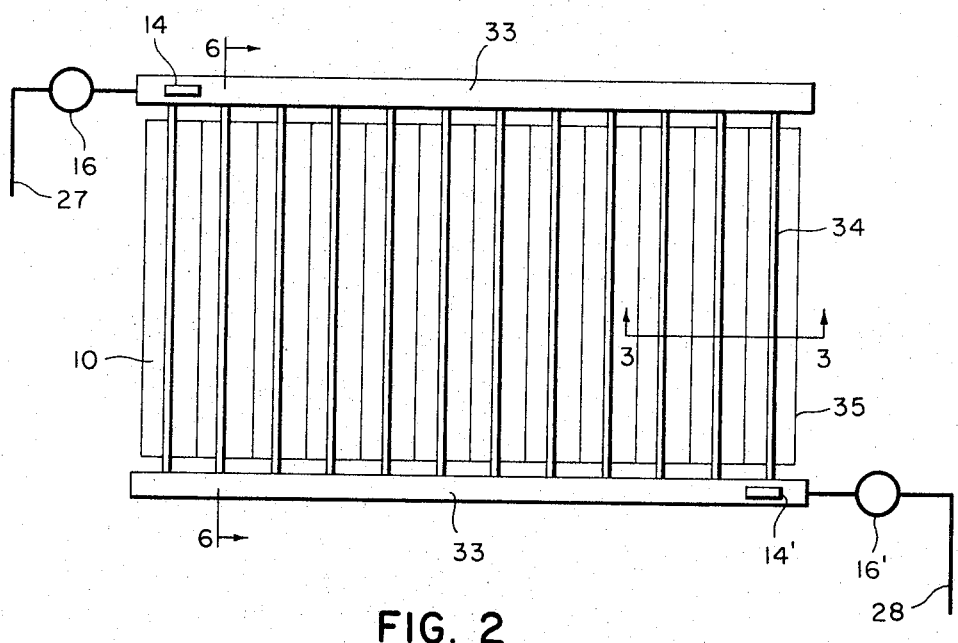
FIG. 2 is a plan view of a collector element.
Figure 3:
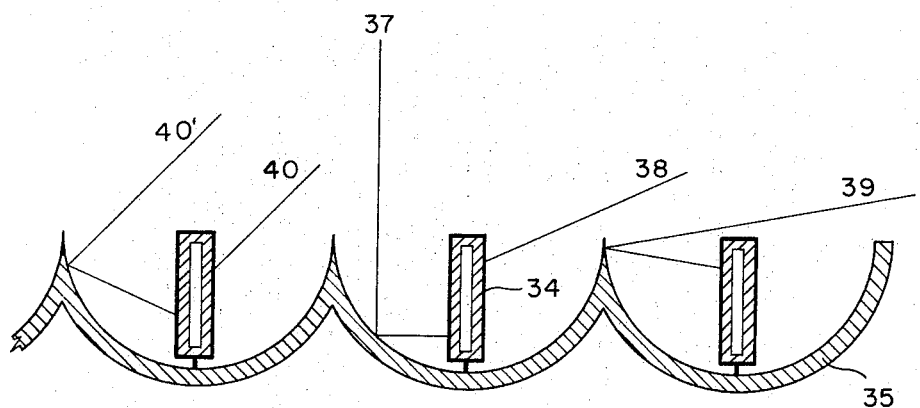
FIG. 3 is a cross section view of lines 3—3 of FIG. 2.

In order to achieve an object of the invention, i.e., to heat and cool a structure year round without auxiliary means, highly efficient elements and methods for heat and cold collection, storage, and use are required. FIGURES 2 and 3 show the structure of a preferred type of heat and cold collector as claimed in my co-pending patent application Ser. No. 539,948 filed April 4, 1966. In FIG. 2, fluid circulators 16 and 16', sensing probes 14 and 14', and flow lines 27 and 28 may be the same as in FIG. 1. The electrical elements of FIG. 1 are not shown to avoid too much duplication. In FIG. 2, fluid transfer from heat storage coil 12 (FIG. 1) and cold storage coil 13 (FIG. 1) enter pipe lines 27 and 28 as previously described in the functioning of the system. When relatively cool fluid, say 70° F. from heat storage ground coil 12 enters collector 10, it does so by entering manifold 33 by way of line 28, thence passes through manifold tubes 34 until said fluid enters manifold 33', whence it leaves manifold 33' by way of pipe line 27.

On a day when solar heat is available, the solar rays impinge on tubes 34 directly or are reflected to same by semi-cylindrical reflectors 35 and the resultant heat received by the tubes 34 is transmitted by conduction to the fluid contained by them thus raising its temperature to a pre-determined level of say 180° F. These tubes and also the manifolds are colored to a heat receptive color such as dark brown or soot black. The heat in manifolds 33 and 33' are also warmed by direct solar rays and while the tubes reach a temperature of 180° F., the manifolds reach a temperature of say 160° F. When this situation obtains the aquastat temperature probe 14 activates fluid circulator 16 as previously described and moves the fluid from collector 10 to ground heat storage coil 12 (FIG. 1) with counter flow from storage coil 12 filling collector 10 with cool fluid.

FIG. 3 is a vertical cross section of part of FIG. 2 taken on line 3—3 of FIG. 2 where 37, 38, 39, and 40 and 40' represent solar radiant heat rays entering collector 10 and either entering tubes 34 directly or by reflection from reflectors 35.

Conversely, when at night in the winter the collector 10 is acting to collect cold instead of heat, it does so by removing heat from cold storage block 13 (FIG. 1) by means of fluid passing through pipe line 27 and filling collector tubes 34. Again referring to FIG. 3, tubes 34 are now the source of radiant energy and in addition to radiating directly into space as represented by rays 40 and 38, this heat is radiated into space by first being reflected by reflectors 35 as represented by rays 37, 39, and 40'. There is also heat exchange in both collection and dissipation by the usual processes of conduction and convection with the atmosphere.

Figure 4:
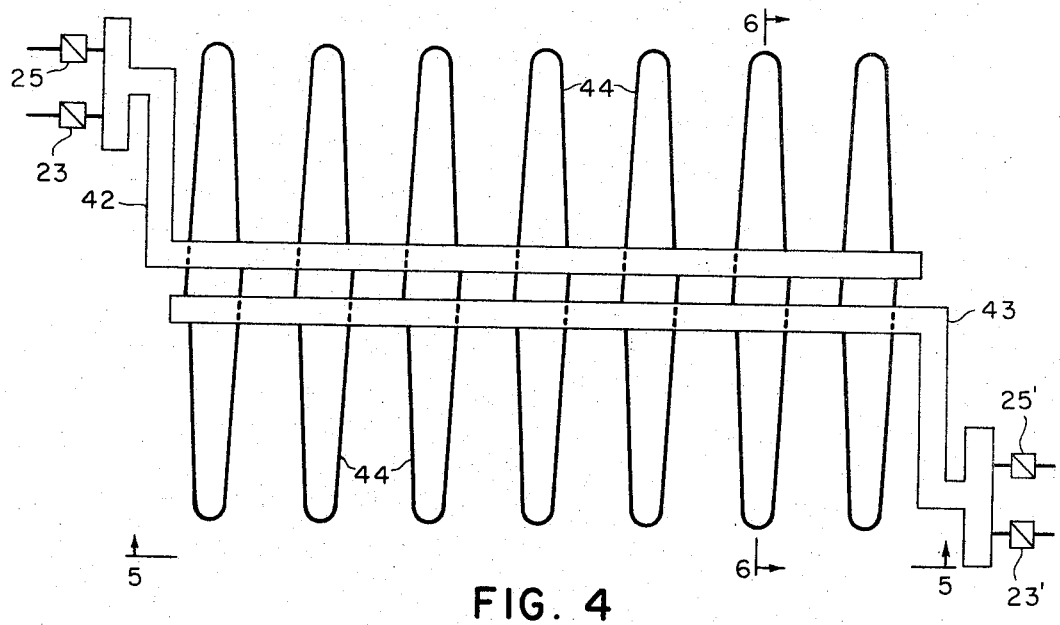
FIG. 4 is a plan view of a storage element.

Ground heat storage unit 12 of FIG. 1 will now be more completely described in a preferred embodiment by describing plan view FIG. 4 wherein check valves 25 and 23 and 25' and 23' correspond to those of like numerals in FIG. 1. In the case of heat storage, hot fluid enters the coil 12 by way of check valve 25 from roof collector 10 and enters manifold 42 from whence it passes outwardly and downwardly through U shaped exchange tubes 44 at spaced intervals in heat storage coil zone 12, from whence said fluid also rises through the latter half of said U shaped tubes 44 upwardly and inwardly to manifold 43 where it comes to rest and loses its heat to the earth ambient coil 12.

Heat storage coil zone 12 should be of sufficient size to heat the house for a full winter when subjected to a full summer's heat, and under average conditions the area underneath a house and 30 feet deep from below the basement floor will suffice in average soil where there is a reasonable amount of solar heat collection in the winter on sunny days. In more extreme conditions and requirements, a larger block and added features are necessary to completely heat the house. To insert said U shaped tubes 44, holes are first bored into the undisturbed earth block 12.

Figure 5:
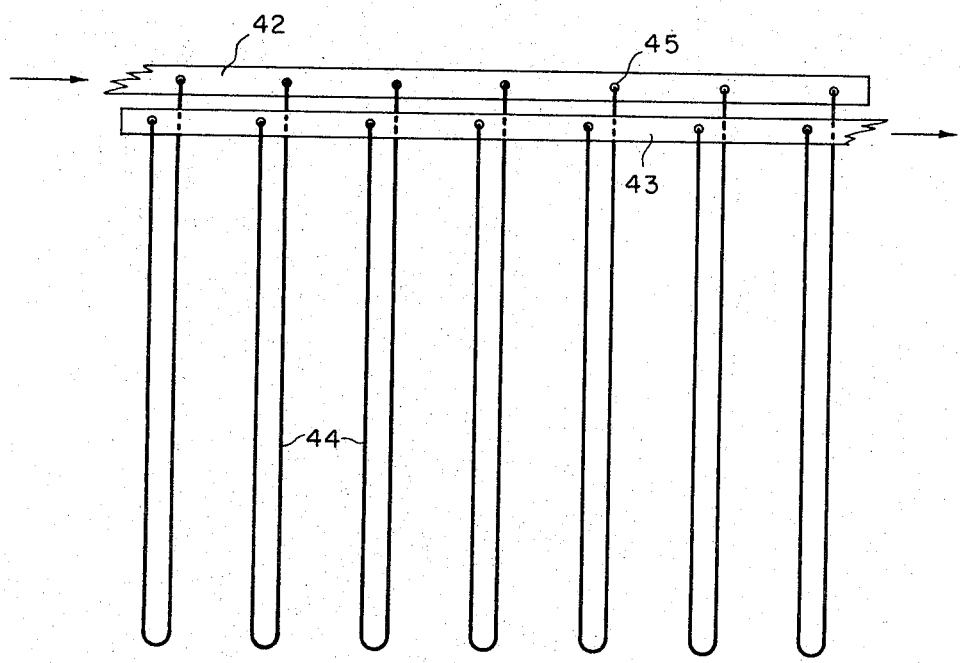
FIG. 5 is an elevation of a section of FIG. 4.

FIG. 5 is a longitudinal elevation taken on line 5—5 of FIG. 4 showing one row of U shaped tubes 44 in their corresponding relationship and connection to manifolds 42 and 43 by way of orifices 45.

When heat is taken from heat storage coil zone 12 to heat the house by means of radiator coil 11, cool fluid from coil 11 enters coil 12 by way of check valve 25 (FIG. 4) and manifold 42; then passes through U shaped tubes 44 and into manifold 43 thus causing a counter flow of fluid in coil 12 (which has been warmed by contact with warm ambient earth) and into the house radiator 11, by way of check valve 25' and line 30' (FIG. 1) which in turn warms the structure.

In like manner cold fluid may be taken from cold storage area 13, (FIG. 1) (which is the same or similar in structure and operation to FIG. 4) and delivered to house coil 11. Said cold fluid then cools said house structure 32 by absorbing heat from same through the processes of radiation from said structure 32 and convection air currents and conduction into radiator 11. The heated fluid is then exchanged with fluid in said cold storage coil 13 where it comes to rest and deposits said heat in said cold storage area 13 ambient earth. In a repetitive process all summer, a considerable quantity of heat is deposited. This heat is then transferred to roof collector 10 the following winter while cold is being stored in cold storage area 13, heating said roof and thereby partially heating said house.

Figure 6:
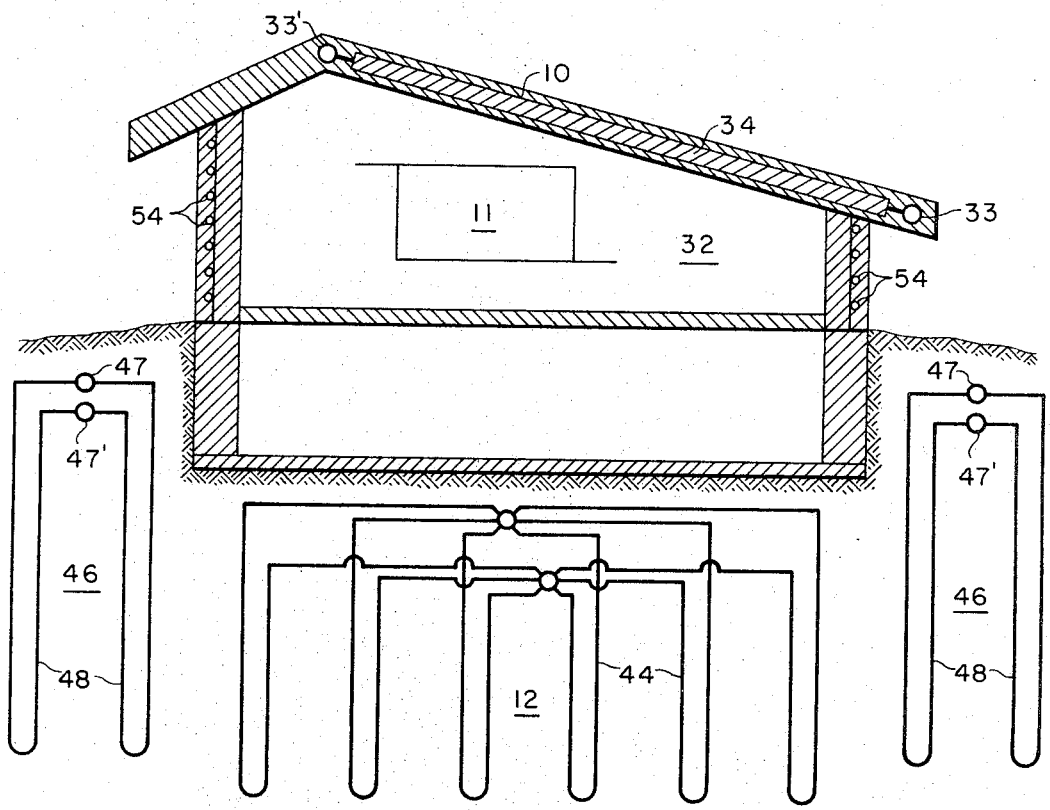
FIG. 6 is a cross section of a house and cross sections of various basic elements of the invention.
Figure 7:
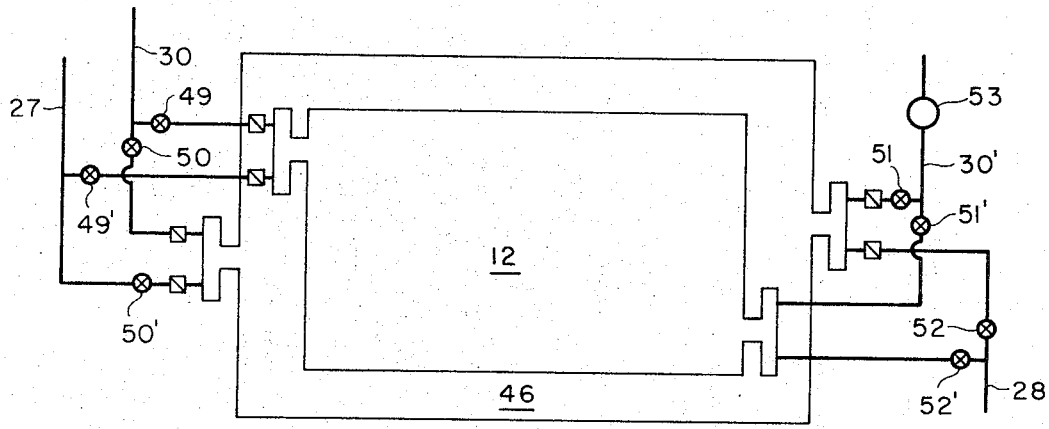
FIG. 7 is a schematic plan view of the hot central and warm perimeter ground storage areas as illustrated in FIG. 6.

FIGURE 6 is a diagrammatic cross section of a house showing the relationship of elements of the heating and cooling system as used in this illustrative embodiment of the invention. Roof collector 10 is shown in cross section on line 6—6 of FIG. 2 and corresponding parts have like numbers. Sub-basement hot storage coil zone 12 is shown in diagrammatical cross sectional elevation taken on line 6—6 of FIG. 4. House radiator coil or temperature conditioning coil 11 is shown in living area of the house or structure 32 (connected relationship being shown in FIG. 1). FIGS. 6 and 7 also show perimeter warm and cool storage zone coil 46 with manifolds 47 and 47' and U return coils 48. This warm and cool storage zone 46 is operated in conjunction with roof coil 10 in the same manner as the hot storage coil 12, but in this case coil 46 is substituted on occasion for hot coil 12 by manually operated valves as illustrated in FIG. 7. When solar energy available in collector 10 is not sufficient to make a profitable exchange with hot zone 12, then hand valve 49' is closed and valve 50' is opened and warm storage zone 46 is automatically substituted for hot zone 12. Thermal probe 14 in roof collector 10 is adjusted downward to say 120° F., for example, to make a more efficient collection of available heat. In the fall and spring also, fluid from warm storage area 46 may be valved through house radiator 11 (FIGS. 1 and 6) by closing valves 49 and 51' and opening valves 50 and 51. Thermoprobe 15 (FIG. 1) is in this case also wired to fluid circulator 53 in line 30' (FIG. 7) which then makes fluid exchange between house coil 11 and warm storage coil 46.

A house warming auxiliary coil is shown within the exterior wall of structure 32 in cross section as tubes 54. These tubes ply between manifolds (not shown) and operate as a standard manifold coil similar to roof coil 10. They are used to warm the exterior walls of said house or structure 32 by being valved by hand valves in substitution for interior house warming coil 11 so that hot fluid from coil 12 or warm fluid from coil 46 may be exchanged either on a continuous basis or as called for by a thermoprobe in the same manner as used in coil 11. Thus when heat from coil 54 is transferred to ground coil 46 to cool said wall, said heat is stored in cool storage block 46 in the process. Then when the wall needs to be warmed in the winter this same heat is brought back from coil storage block of earth 46 into coil 54 to warm said wall. Likewise auxiliary coils 54 may be alternately (depending on whether warming or cooling effect is desired) hand valved into pipe lines 27 and 28 to take advantage of the warming and cooling effect of the fluid flowing to and from roof collector 10.

The heat and cold from my highly efficient roof collector 10 is alternately transferred into highly efficient storage means. In order to provide this adequate heat and cold storage in the earth, a large volume of the right condition of the earth is necessary. By the method of boring inexpensive holes into the earth, (in actual practice 40 feet are bored in 4 minutes), in checker board fashion, and inserting therein U shaped tubes which are connected on opposite ends to manifolds, large storage blocks of readily conductive undisturbed earth are provided. The larger the block thus constructed, the less is the loss of heat or cold by conduction to outer areas. Thus a point in size is reached where the economical complete heating or cooling of a structure is made possible entirely from natural sources without the necessity of increasing their intensity and without the necessity of using auxiliary means.

Since the perimeter heat losses through the surface on all sides of a storage block or structure is directly proportional to the temperature of the block or structure on the one hand and of ambient areas on the other, my design and invention of zoning the block and the structure as to temperature gradient greatly reduces these perimeter heat losses. Also individual temperature storage zone gradations provide storage zones for the temperatures of heat and cold of a lower magnitude not possible to store in a central block of intensive heat or cold. Additionally, these perimeter zones recover conducted perimeter losses of heat or cold from the central blocks.

These moderate temperatures of heat and cold are then used to modify the temperature of the structure during periods of low requirements and for zoned conditioning. Also temperatures ambient to the collector and structure coils provide moderate heat and cold for transfer and storage in these perimeter zones.

These improvements improve and increase the efficiency of heating and cooling by natural means over the prior art many fold.

The present invention may be carried out in other specific ways than those herein set forth without departing from its spirit and essential characteristics of invention. The present embodiments are, therefore, to be considered in all respects as illustrative and not restrictive; and all changes coming within the meaning and equivalency range of the appended claims are intended to be embraced herein.

What is claimed is:

1. A ground storage means for structure heating and cooling systems comprising a heat storage area located in generally undisturbed earth adjacent said structure; first heat exchange means constructed within said heat storage area; a warm storage area located about the vertical perimeter of said heat storage area; a second heat exchange means constructed within said warm storage area; a cold storage area located in generally undisturbed earth adjacent said structure; a third heat exchange means constructed within said cold storage area; a cool storage area located about the vertical perimeter of said cold storage area; and a fourth heat exchange means constructed within said cool storage area whereby means for transferring a temperature conducting media may be selectively connected between said heat exchangers and said structure to selectively warm and cool the same.

2. A ground storage means for a structure temperature conditioning system comprising a concentrated temperature storage area located in generally undisturbed earth adjacent said structure; first heat exchange means constructed within said concentrated storage area; an intermediate temperature storage area located about the vertical perimeter of said concentrated storage area; and a second heat exchange means constructed within said intermediate storage area whereby means for transferring a temperature conducting media may be selectively connected between said exchange means and said structure to selectively temperature condition the same.

3. A structure heating and cooling system using the earth to store heat and cold until needed comprising a first block of generally undisturbed earth having a top, a bottom and a vertical perimeter; means for transferring heat to and from said first block; a first peripheral zone of generally undisturbed earth extending about the vertical perimeter of said first block; means for transferring warmth to and from said zone; a second block of generally undisturbed earth having a top, a bottom and a vertical perimeter; means for transferring cold to and from said second block; a second peripheral zone of generally undisturbed earth surrounding the vertical perimeter of said second block; means for transferring coolness to and from said second zone; and means for selectively connecting each of said transfer means to a heat exchange means located within said structure whereby said structure may be temperature conditioned.

4. In a heating system for a structure having walls and incorporating the storage of heat obtained from first natural sources in a defined block of generally undisturbed earth surrounded on its vertical perimeter by a defined storage area of lesser temperature concentration obtained from second natural sources; the improvement comprising a temperature conducting media; means for transferring said media from said perimeter storage area through the walls of said structure and back into the area whereby the amount of temperature needed from said block to heat said structure is greatly reduced.

5. In a temperature conditioning system for multi-walled structures which collects temperatures from first natural sources and stores the same selectively in a concentrated temperature storage area located in generally undisturbed earth adjacent the structure and in a storage zone of lesser temperature concentration obtained from second natural sources located about the vertical perimeter of said area, said system having means for selectively transferring the temperatures from the storage area and the storage zone to heat exchange means located within the structure, the improvement comprising: means for transferring a heat conducting media from the storage zone, through at least one of the walls of the structure, and back into said zone whereby said structure may be auxiliary temperature conditioned from natural sources.

References Cited

UNITED STATES PATENTS

| | | | |
|---|---|---|---|
| 2,007,406 | 7/1935 | Miller | 165—45 |
| 2,396,338 | 3/1946 | Newton | 165—45 X |
| 2,428,876 | 10/1947 | Hawkins | 165—18 |
| 2,581,744 | 1/1952 | Zimmerman | 165—45 X |
| 2,689,090 | 9/1954 | Wetherbee et al. | 165—45 X |
| 2,780,415 | 2/1957 | Gay | 62—260 X |

MEYER PERLIN, *Primary Examiner.*

ROBERT A. O'LEARY, *Examiner.*

M. A. ANTONAKAS, *Assistant Examiner.*